(12) United States Patent
Asai

(10) Patent No.: US 10,336,098 B2
(45) Date of Patent: Jul. 2, 2019

(54) COMPUTER-READABLE STORAGE MEDIUM, INFORMATION PROCESSING APPARATUS, AND METHOD FOR IMAGE PROCESSING

(71) Applicant: Brother Kogyo Kabushiki Kaisha, Nagoya, Aichi (JP)

(72) Inventor: Norihiko Asai, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/939,955

(22) Filed: Mar. 29, 2018

(65) Prior Publication Data
US 2019/0100028 A1  Apr. 4, 2019

(30) Foreign Application Priority Data
Sep. 29, 2017 (JP) ................................ 2017-191465

(51) Int. Cl.
| | |
|---|---|
| *G06F 3/12* | (2006.01) |
| *B41J 3/407* | (2006.01) |
| *B41J 13/00* | (2006.01) |
| *G11B 7/0037* | (2006.01) |
| *G11B 23/40* | (2006.01) |

(52) U.S. Cl.
CPC ........ *B41J 3/4071* (2013.01); *B41J 13/0018* (2013.01); *B41J 13/0027* (2013.01); *G11B 7/0037* (2013.01); *G11B 23/40* (2013.01)

(58) Field of Classification Search
CPC .. B41J 3/4071; B41J 13/0018; B41J 13/0027; G11B 23/40; G11B 7/0037

USPC ........................................................ 358/1.13
See application file for complete search history.

(56) References Cited

U.S. PATENT DOCUMENTS

| | | | | |
|---|---|---|---|---|
| 2004/0239974 | A1* | 12/2004 | Uchida ................. | G06F 3/1205 358/1.14 |
| 2009/0184989 | A1* | 7/2009 | Block .................... | B41J 3/4071 347/5 |
| 2015/0055178 | A1* | 2/2015 | Ishibashi ............... | G06F 3/1206 358/1.15 |

FOREIGN PATENT DOCUMENTS

| | | |
|---|---|---|
| JP | 2011-76674 A | 4/2011 |
| JP | 2012-175344 A | 9/2012 |

* cited by examiner

*Primary Examiner* — Neil R McLean
(74) *Attorney, Agent, or Firm* — Banner & Witcoff, Ltd.

(57) ABSTRACT

A non-transitory computer readable storage medium storing computer readable instructions that are executable by a computer is provided. The computer readable instructions, when executed by the computer running the image processing program, cause the computer to generate an image to be printed on a particular type of printing medium in a printing apparatus, control a display to display the generated image, set a printing mode to one of a regular printing mode and a trial printing mode, in the regular printing mode, generate print-image information to be used in the printing apparatus to print the image on the particular type of printing medium, and in the trial printing mode, generate print-image information to be used in the printing apparatus to print the image on another type of printing medium different from the particular type, and transmit the generated print-image information to the printing program.

13 Claims, 8 Drawing Sheets

COMPUTER-READABLE STORAGE MEDIUM, INFORMATION PROCESSING APPARATUS, AND METHOD FOR IMAGE PROCESSING

CROSS REFERENCE TO RELATED APPLICATION

This application claims priority from Japanese Patent Application No. 2017-191465, filed on Sep. 29, 2017, the entire subject matter of which is incorporated herein by reference.

BACKGROUND

Technical Field

An aspect of the present disclosure is related to a technique to process an image, which may be printed on a printing medium.

Related Art

A technique to print an image on a label surface of an information storage media such as CDs and DVDs is known. For example, a technique to generate printable image data, which may be transmitted to a printer and used in the printer to print an image on a label surface of a storage medium, is known.

SUMMARY

When a user creates an image to be printed on a label surface of a storage medium, the user may wish to print the image on a printing medium different from the label surface as a sample to grasp the image before printing the image immediately on the label surface of the printing medium.

Meanwhile, a label-creating application, which may allow the user to create the image to be printed on the label surface of the printing medium, may be installed in an information processing apparatus separately from a printing application, which may transmit print data to the printer. For example, the label-creating application may be installed in the information processing apparatus as plug-in software to be added on the printing application.

In such a case where the label-creating application is installed separately from the printing application, a procedure to print an image created in the label-creating application through the printer may be complicated. For example, if a user attempts to print the image firstly on a sample printing medium, e.g., paper, as trial, and secondly on an originally intended printing medium, e.g., a storage medium, the user may find it bothersome to operate the information processing apparatus to switch the software applications back and forth.

The present disclosure is advantageous in that a technique, which enables cooperation between a software application capable of creating an image to be provided to a printing apparatus to print the image on a specific printing medium and a software application capable of transmitting print data expressing the created image to the printing apparatus, to enable trial printing and regular printing of the image in the printing apparatus efficiently, is provided.

According to an aspect of the present disclosure, a non-transitory computer readable storage medium storing computer readable instructions that are executable by a computer in an information processing apparatus having a display and an input interface, is provided. The computer is configured to run a printing program and an image processing program. The computer running the printing program is configured to generate print data to be used in a printing apparatus to print an image indicated by image data included in print-image information received from the image processing program and transmit the generated print data to the printing apparatus. The computer readable instructions, when executed by the computer running the image processing program, cause the computer to generate the image to be printed on a particular type of printing medium in the printing apparatus; control the display to display the generated image; set a printing mode in the image processing program to one of a regular printing mode and a trial printing mode based on a setting operation input through the input interface; generate the print-image information including the image data, the image data indicating the generated image, the computer generating, in a case where the printing mode is set to the regular printing mode, the print-image information to be used in the printing apparatus to print the image on the particular type of printing medium, and the computer generating, in a case where the printing mode is set to the trial printing mode, the print-image information to be used in the printing apparatus to print the image on another type of printing medium different from the particular type; and transmit the generated print-image information to the printing program.

According to another aspect of the present disclosure, an information processing apparatus, having a display, an input interface, and a controller configured to run a printing program and an image processing program, is provided. The controller is configured to generate an image to be printed on a particular type of printing medium in a printing apparatus according to the image processing program; control the display to display the generated image according to the image processing program; set a printing mode in the image processing program to one of a regular printing mode and a trial printing mode based on a setting operation input through the input interface according to the image processing program; generate print-image information including image data according to the image processing program, the image data indicating the generated image, the controller generating, in a case where the printing mode is set to the regular printing mode, the print-image information to be used in the printing apparatus to print the image on the particular type of printing medium, and in a case where the printing mode is set to the trial printing mode, the controller generating the print-image information to be used in the printing apparatus to print the image on another type of printing medium different from the particular type; transmit the generated print-image information to the printing program according to the image processing program; and generate print data according to the printing program, the print data being used in the printing apparatus to print the image indicated by the image data included in the print-image information received from the image processing program.

According to another aspect of the present disclosure, a method for processing an image in an information processing apparatus having a display is provided. The information processing apparatus is configured to run an image processing program and a printing program. The method includes generating the image to be printed on a particular type of printing medium in a printing apparatus according to the image processing program; controlling the display to display the generated image according to the image processing program; setting a printing mode in the image processing program to one of a regular printing mode and a trial printing mode based on input of a setting operation according to the image processing program; in a case where the printing mode is set to the regular printing mode, generating print-image information to be used in the printing apparatus to print the image on the particular type of printing medium, and in a case where the printing mode is set to the trial printing mode, generating the print-image information to be used in the printing apparatus to print the image on another type of printing medium different from the particular type; transmitting the generated print-image information to the printing program according to the printing program; and generating print data according to the printing program, the print data being used in the printing apparatus to print the image indicated by the image data included in the print-image information received from the image processing program.

BRIEF DESCRIPTION OF THE ACCOMPANYING DRAWINGS

Figure 4:
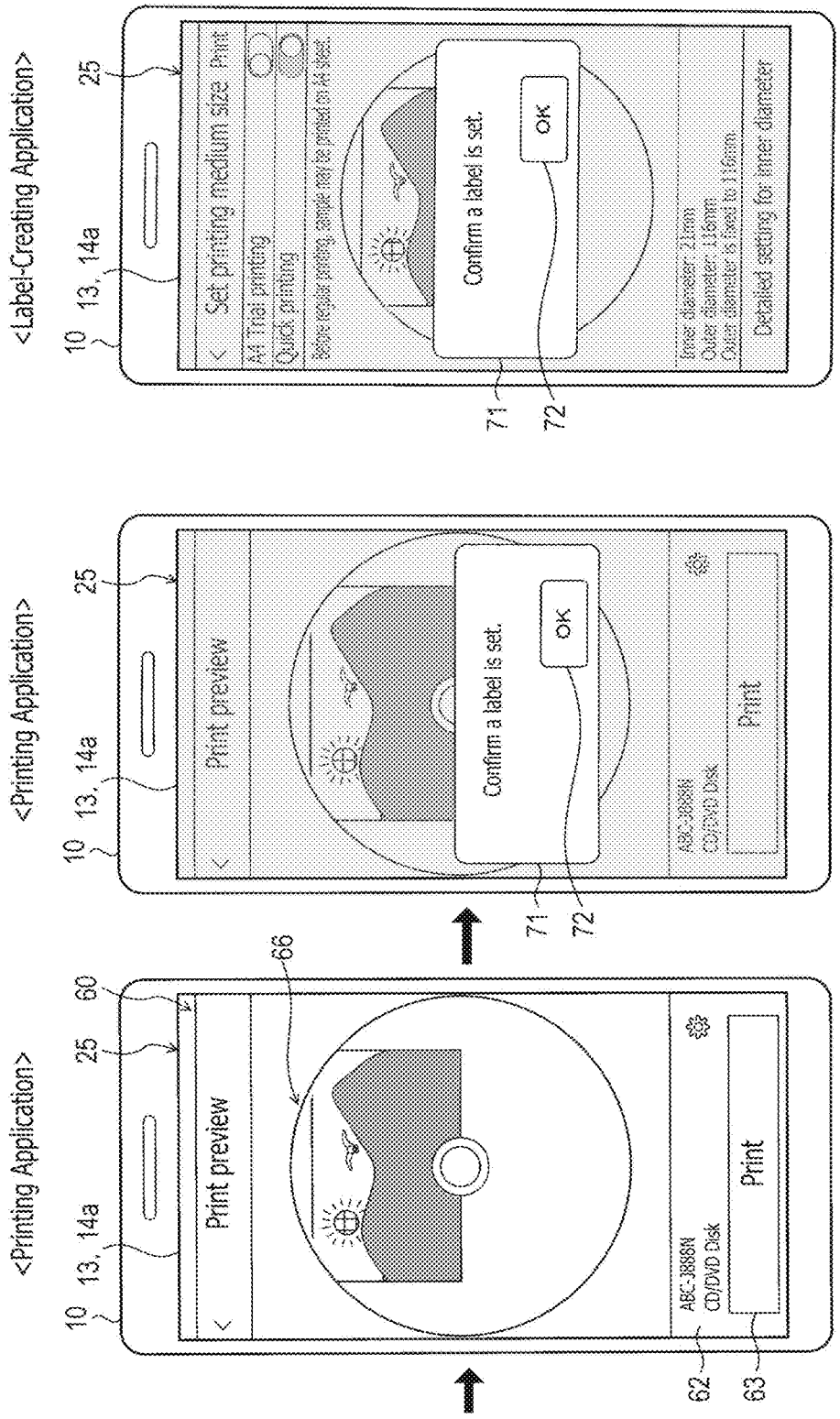

FIG. 4A illustrates transition of screens before and after transmitting print data for regular printing in the information processing apparatus in the label printing system according to the embodiment of the present disclosure. FIG. 4B illustrates a printer condition confirmation guidance to be displayed in a regular printing mode in the label-creating application according to the embodiment of the present disclosure.

Figure 5:
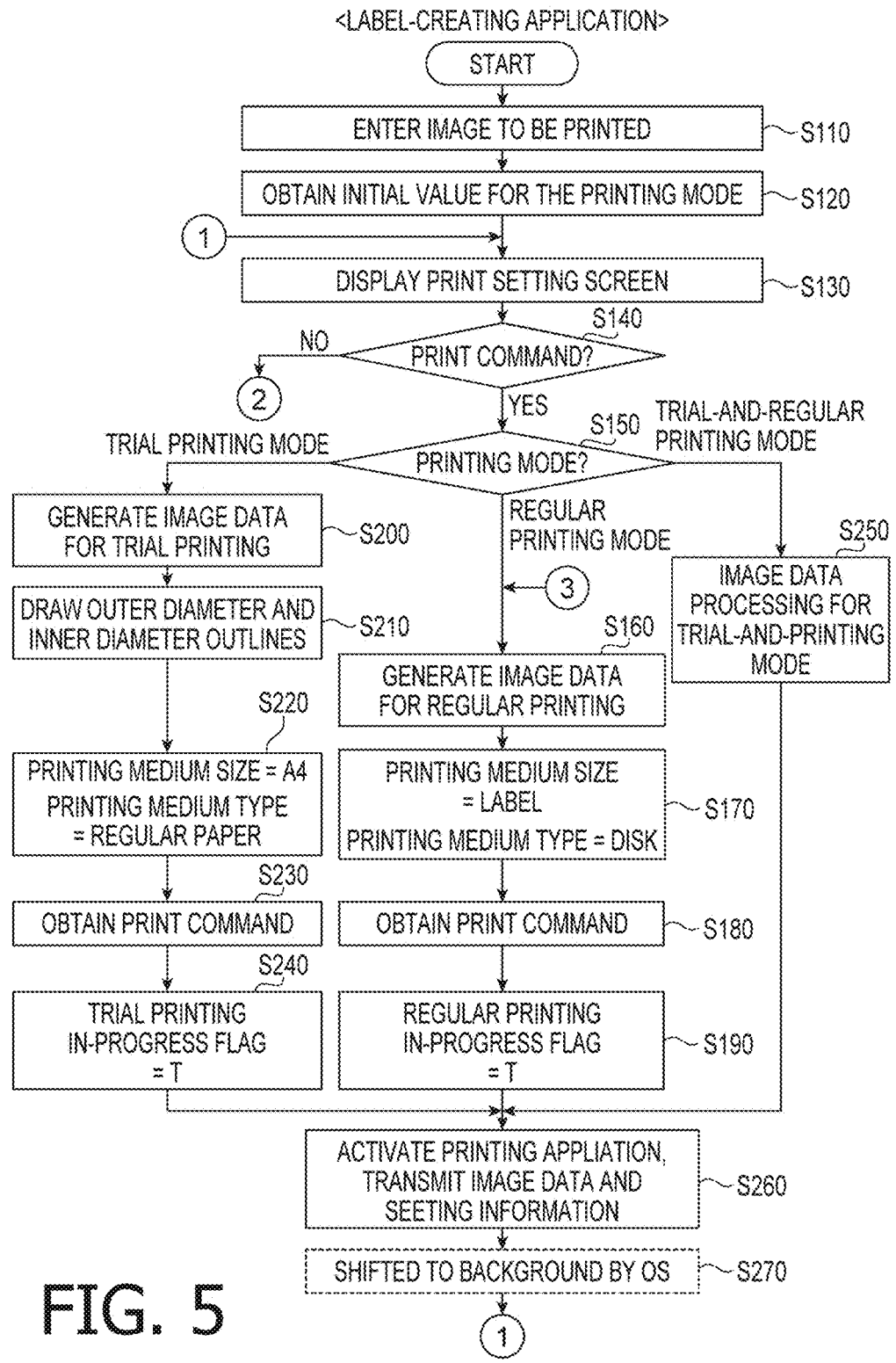

FIG. 5 is a flowchart to illustrate a part of flows in a label-image creating process to be conducted in the label-creating application in the label-printing system according to the embodiment of the present disclosure.

Figure 6:
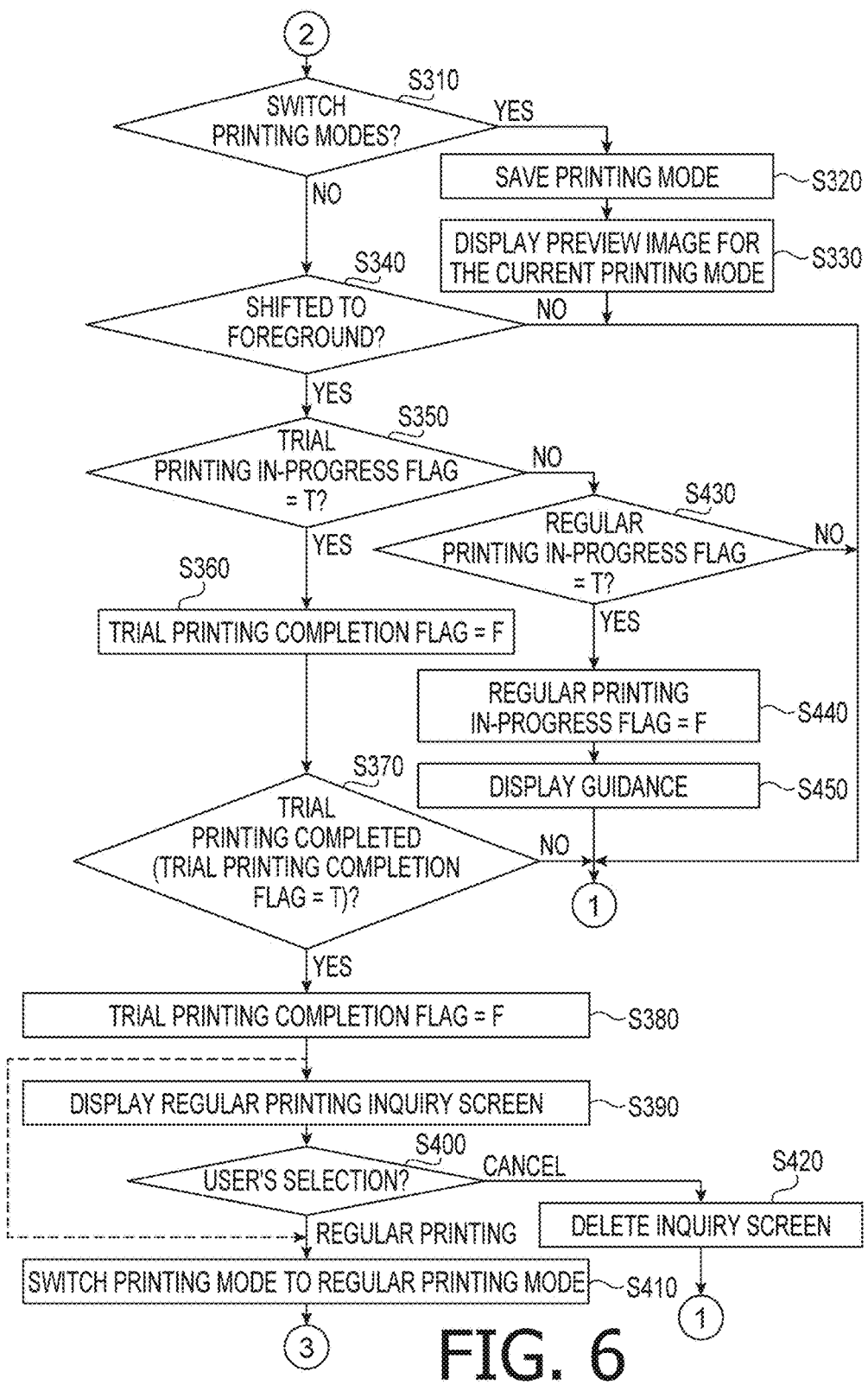

FIG. 6 is a flowchart to illustrate another part of the flows in the label-image creating process to be conducted in the label-creating application in the label-printing system according to the embodiment of the present disclosure.

Figure 7:
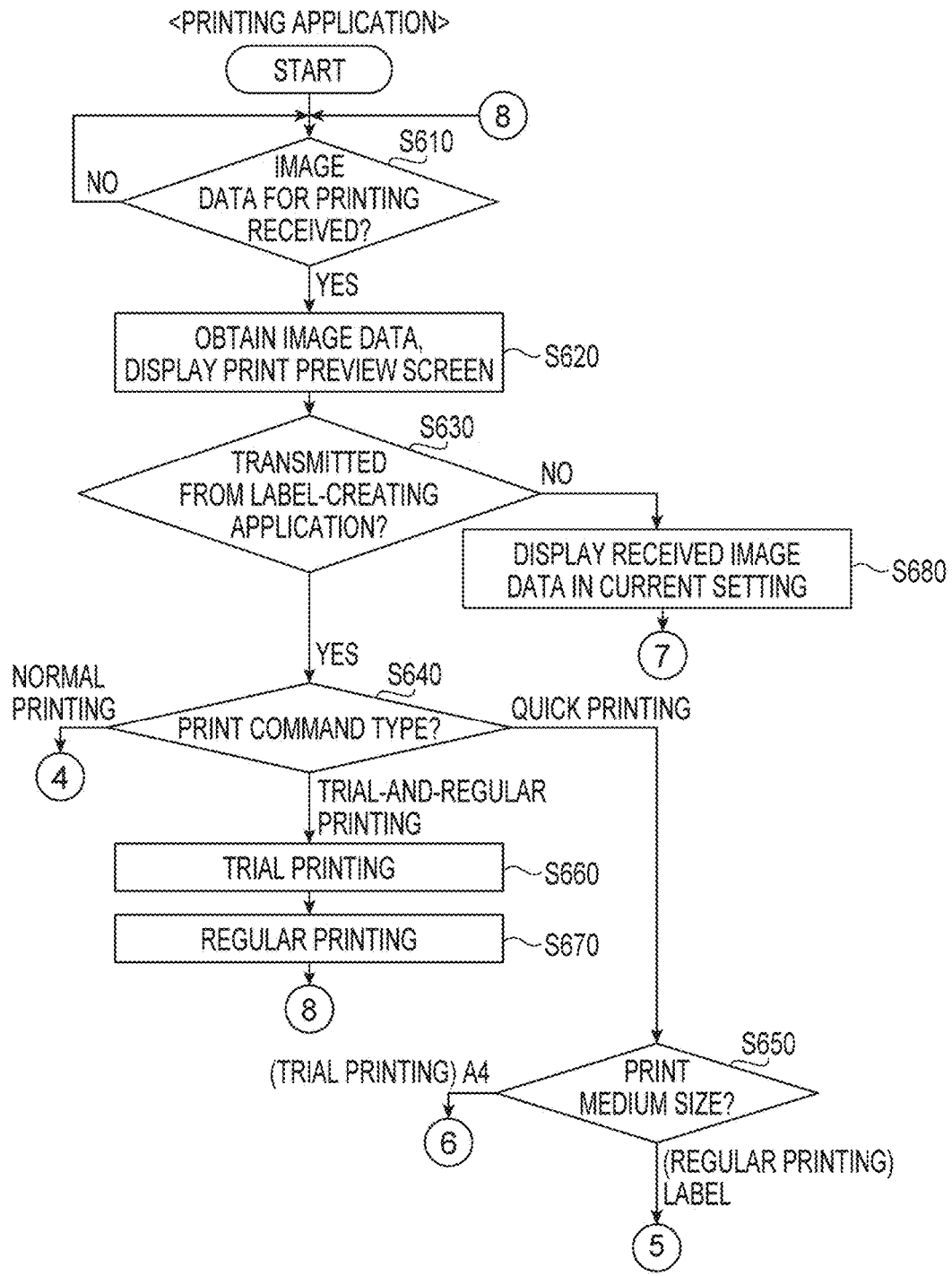

FIG. 7 is a flowchart to illustrate a part of flows of a print data transmitting process to be conducted in the printing application in the label-printing system according to the embodiment of the present disclosure.

Figure 8:
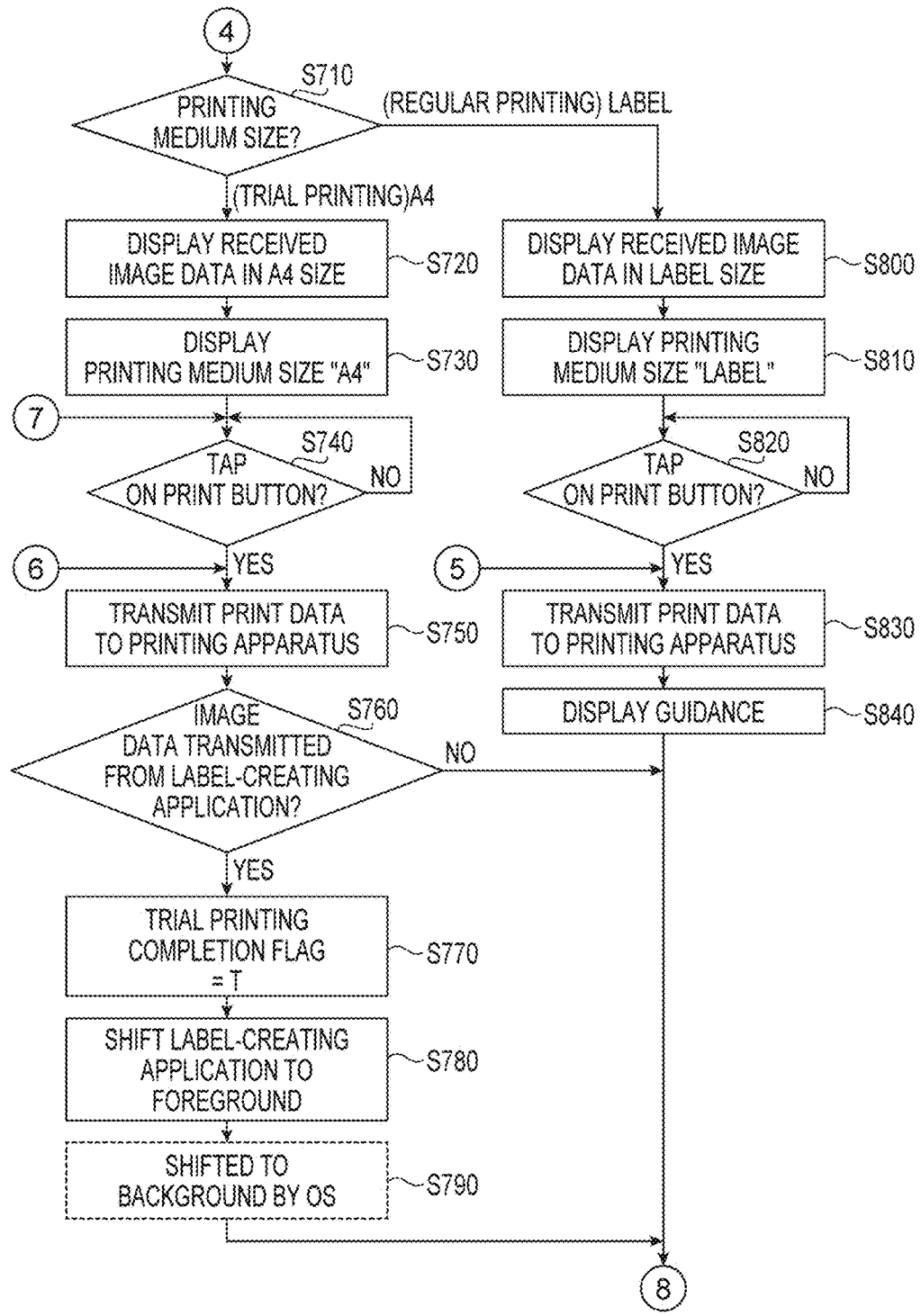

FIG. 8 is a flowchart to illustrate another part of the flows of the print data transmitting process to be conducted in the printing application in the label-printing system according to the embodiment of the present disclosure.

DETAILED DESCRIPTION

Hereinafter, embodiments of the present disclosure will be described with reference to the accompanying drawings.

Embodiment

1. Configuration of Label Printing System

Figure 1:
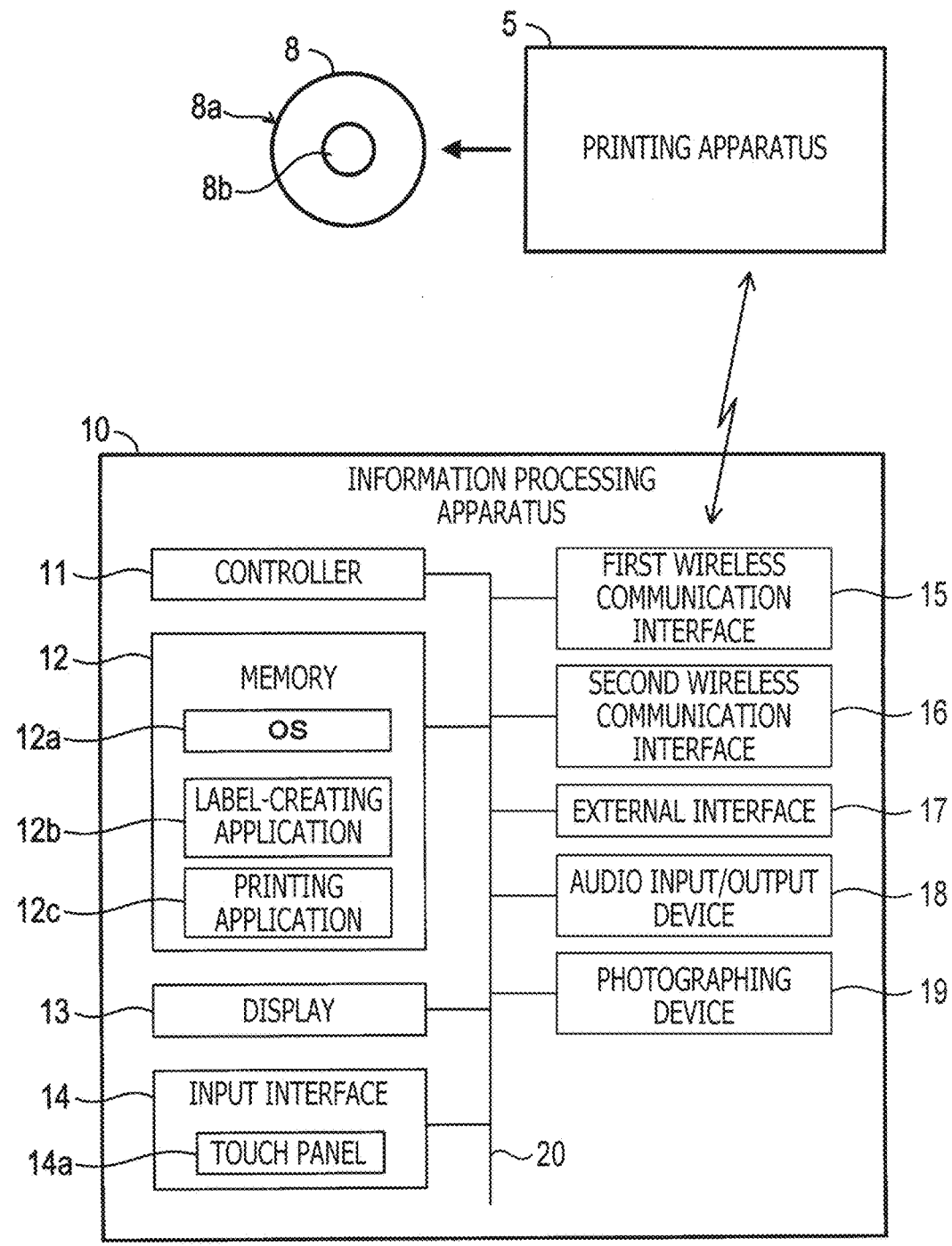
FIG. 1 is a block diagram to illustrate a configuration of a label printing system according to an embodiment of the present disclosure.

As shown in FIG. 1, a label printing system in the present embodiment includes an information processing apparatus 10 and a printing apparatus 5. The label printing system may print an image on a label surface 8a of a memory medium 8, which may be, for example, in a shape of a disk. The label surface 8a is on one of two sides of the memory medium 8. An image to be printed on the label surface 8a may be created in the information processing apparatus 10, and print data based on the created image may be transmitted to the printing apparatus 5 so that the printing apparatus 5 may print the image based on the transmitted print data on the label surface 8a of the memory medium 8.

At a central area in the disk shape of the label surface 8a, arranged concentrically is a circular inner diameter region 8b, in which no image is printable. The inner diameter region 8b includes a round hole, which is bored through the memory medium 8 in an orthogonal direction with respect to the label surface 8a concentrically with the label surface 8a. The memory medium 8 may be a round disk-shaped memory medium, such as a CD or a DVD, in which data is storable. In the following description, the memory medium 8 may be called as a disk 8.

2. Configuration of Information Processing Apparatus

The information processing apparatus 10 may be a mobile communication terminal capable of wireless communication and includes, for example, a smartphone and a tablet terminal. FIGS. 2 through 4B illustrate a front view of the information processing apparatus 10.

The information processing apparatus 10 includes a controller 11, a memory 12, a display 13, an input interface 14, a first wireless communication interface 15, a second wireless communication interface 16, an external interface 17, an audio input/output device 18, and a photographing device 19, which are connected with one another through a bus line 20 to exchange data.

The controller 11 may include a CPU (not shown). The memory 12 may include a semiconductor memory including, for example, a ROM, a RAM, an NVRAM, and a flash memory, which are not shown. In other words, the information processing apparatus 10 is equipped with a microcomputer that includes a CPU and semiconductor memory media.

The controller 11 may run programs stored in a non-transitory storage medium, i.e., the memory 12, to implement multiple functions. In other words, the information processing apparatus 10 may implement the functions by the controller 11 running the programs stored in the memory 12. Meanwhile, the functions of the information processing apparatus 10 may not necessarily be implemented by the controller 11 running the programs but may be implemented by one or more hardware devices operating in conjunction with one another.

The memory 12 may store a plurality of kinds of software programs and data. The memory 12 may store, for example, an operating system (OS) 12a, a label-creating application 12b, and a printing application 12c, as software programs. The OS 12a, the label-creating application 12b, the printing application 12c are installable in a computer system that contains the controller 11.

In the following description, behaviors of the controller 11, or the CPU (not shown) in the controller 11, executing a software program may be described as if they are behaviors by the software program. That is, for example, expression such as "the label-creating application 12b starts . . . " may mean "the CPU of the controller 11 running the label-creating application 12b starts . . . ."

The label-creating application 12b is an application program configured to create image data for an image to be printed on the label surface 8a and transmit the created image data to the printing application 12c. The label-creating application 12b may create image data for an image including, at least, an image object and text, which may be selectively entered by a user. In the following description, the term "transmit" as in "the label-creating application 12b transmits the created image data to the printing application 12c" may or may not necessarily mean transition of data from one site to another site. In particular, the term "transmit" as in "the label-creating application 12b transmits the created image data to the printing application 12c" may mean "supply the data from one application program to another application program within the memory 12.

The printing application 12c is configured to generate print data, which may operate the printing apparatus 5 to print the image expressed by the image data, based on the image data transmitted thereto from the label-creating application 12b and transmit the generated print data to the printing apparatus 5. The printing application 12c may work in conjunction with the label-creating application 12b, which may be provided as a plug-in application to be added to the printing application 12c.

The display 13 includes a display device, such as a liquid crystal display and an organic EL display, to display images.

The input interface 14 includes an input device, through which inputting operations from the user may be entered. The input device in the input interface 14 includes a touch panel 14a, which is laid over a displayable area 25 (see FIGS. 2 through 4B) in the display device in the display 13. The touch panel 14a is an input device, which may detect pointing actions by a pointer (not shown), e.g., the user's finger or a pointing device, to point at a particular position in an image the displayable area 25 in the display 13. The pointing actions include at least one of touching on the touch panel 14a with the pointer and placing the pointer approximately to the touch panel 14a. The touch panel 14a may, in response to the pointing action by the pointer, output an action-detecting signal, which indicates the position where the pointing action occurred.

The controller 11 may detect the pointer based on the action-detecting signal output from the touch panel 14a. In other words, the controller 11 may detect occurrence of the pointing action by the pointer, the position where the pointing action occurred, and a pattern of the pointing action. The pointing action may be, for example, detected in the OS 12a, and the detected result may be provided to the label-creating application 12b and to the printing application 12c. For another example, the label-creating application 12b and the printing application 12c may respectively detect the pointing action from the action-detecting signal. The patterns of the pointing actions detectable by the controller 11 may include, for example, tapping, dragging, flicking, pinching-in, and pinching-out.

The external interface 17 is an interface, to which a rewritable non-volatile memory medium (not shown) may be attached. The external interface 17 may control data exchange with the memory medium attached thereto.

The audio input/output device 18 may include a microphone and a speaker.

The photographing device 19 may include a digital camera, which may shoot an image and generate image data to express the shot image. The image data shot by the photographing device 19 may be stored in, for example, the memory 12.

The first wireless communication interface 15 enables wireless LAN communication between the information processing apparatus 10 and an external device (not shown) according to, for example, a wireless LAN standard. The wireless LAN communication through the first wireless communication interface 15 may include, for example, communication according to IEEE 802.11b/g/n.

The information processing apparatus 10 may communicate wirelessly with the printing apparatus 5 through the first wireless communication interface 15. The print data generated in the printing application 12c may be transmitted to the printing apparatus 5 in the wireless LAN communication. The wireless LAN communication with the printing apparatus 5 may be conducted in, for example, ad-hoc mode directly or in an infrastructure mode through an intermediate relaying device, which is not shown.

The second wireless communication interface 16 enables audio conversation and data exchange through a mobile communication network with an external device (not shown). The second wireless communication interface 16 enables wireless communication with the external device according to, for example the Long Term Evolution (LTE) standard.

3. Configuration of Printing Apparatus

The printing apparatus 5 has a label-printing function. For example, the printing apparatus 5 may receive the print data transmitted from the information processing apparatus 10 and, when the received print data designates the disk 8 as a printing medium, the printing apparatus 5 may print an image contained in the received print data on the label surface 8a of the disk 8. The user may thus use the label-printing function to print an image on the label surface 8a of the disk 8. The printing apparatus 5 may communicate wirelessly with another devices, including the information processing apparatus 10, in the wireless LAN communication environment.

The printing apparatus 5 has a printing mechanism to print an image expressed by the print data input thereto on various forms of printing media using an inkjet printing or electro-photographic printing technology.

The printing apparatus 5 may print images on a plurality of types of printing media, which include at least the disk 8 and another type of printing medium. Another type of printing medium may include rectangular-shaped paper media, such as, for example, regular printable sheet, postcard, and photo-printable sheet. The paper media usable in the printing apparatus 5 may be in a plurality of sizes. For example, the regular sheet paper may include sizes of A4, A3, B5, letter, and legal.

4. Overview of Label-Creating Application 12b and Printing Application 12c

The controller 11 may execute the label-creating application 12h when the information processing apparatus 10 is active and after a particular activating event to execute the label-creating application 12b occurs.

The printing application 12c may be executed in response to an activating event in a similar manner to the label-creating application 12b or may be executed automatically and maintained running while the controller 11 is active. Alternatively, the printing application 12c may be executed in response to activation of the label-creating application 12b or when the print data is transmitted from the label-creating application 12b to the printing application 12c.

The label-creating application 12b may, when active, display a layout selecting screen (not shown) in the displayable area 25 of the display 13. The layout selecting screen is a screen, through which the user may select one of a plurality of layout options to arrange image objects to be printed on the label surface 8a. The user may tap on one of the layout options being displayed in the layout selecting screen to select a preferable layout among the layout options.

The label-creating application 12b may accept the user's selection through the layout selecting screen and set the selected layout as a printing layout. The label-creating application 12b may, after setting the printing layout, display a picture selecting screen (not shown) in the displayable area 25 of the display 13. The picture selecting screen is a screen, through which the user may select an image object to be printed on the label surface 8a. In the picture selecting screen, for example, displayed may be thumbnails representing data of pictures stored in a predetermined data folder in the memory 12. The user may tap on one of the thumbnails of the pictures to be printed on the label surface 8a to select the tapped picture as an image object.

The label-creating application 12b may, in response to the tapping action on one of the thumbnails displayed in the picture selecting screen, set the picture corresponding to the tapped thumbnail as the image object to be printed on the label surface 8a.

The label-creating application 12b may, after setting the image object, display a picture adjusting screen (not shown) in the displayable area 25 of the display 13. The picture adjusting screen is a screen, through which the user may adjust a position and/or a size of the image object in an object-placement area within an in the set printing layout. When arrangement of the image object, including the position and the size of the object image, is decided through the picture adjusting screen, the label-creating application 12b may display a label editor screen 30, as shown on the left in FIG. 2.

The label editor screen 30 includes a printed medium image 31 and an edit-completion button 32. The printed medium image 31 represents the image to be printed on the label surface 8a, including the image object decided in the picture adjusting screen. The printed medium image 31 shows expected appearance of the image, which was adjusted in the picture adjusting screen and is to be printed on the label surface 8a of the disk 8.

The user may edit the text to be printed through the label editor screen 30. In particular, the label-creating application 12b may edit contents, sizes, colors, and positions of the text.

When the edit completion button 32 in the label editor screen 30 is tapped by the user, the label-creating application 12b may accept the content and appearance of the printed medium image 31 at the tapped time as the image to be printed on the label surface 8a. The label-creating application 12b may display a print setting screen 40 as shown at the center in FIG. 2.

The print setting screen 40 includes a printing-medium size information 43, an inner diameter setting button 44, a printing-mode setting switch 45, a quick-printing setting switch 46, and a print button 47. The printing-mode setting switch 45 may be a software toggle switch, through which the user may select a printing mode between a regular printing mode to print the image regularly on a specific type of printing medium, e.g., the disk 8, and a trial printing mode to print a sample image as a trial on another type of printing medium, e.g., printing paper.

Figure 2:
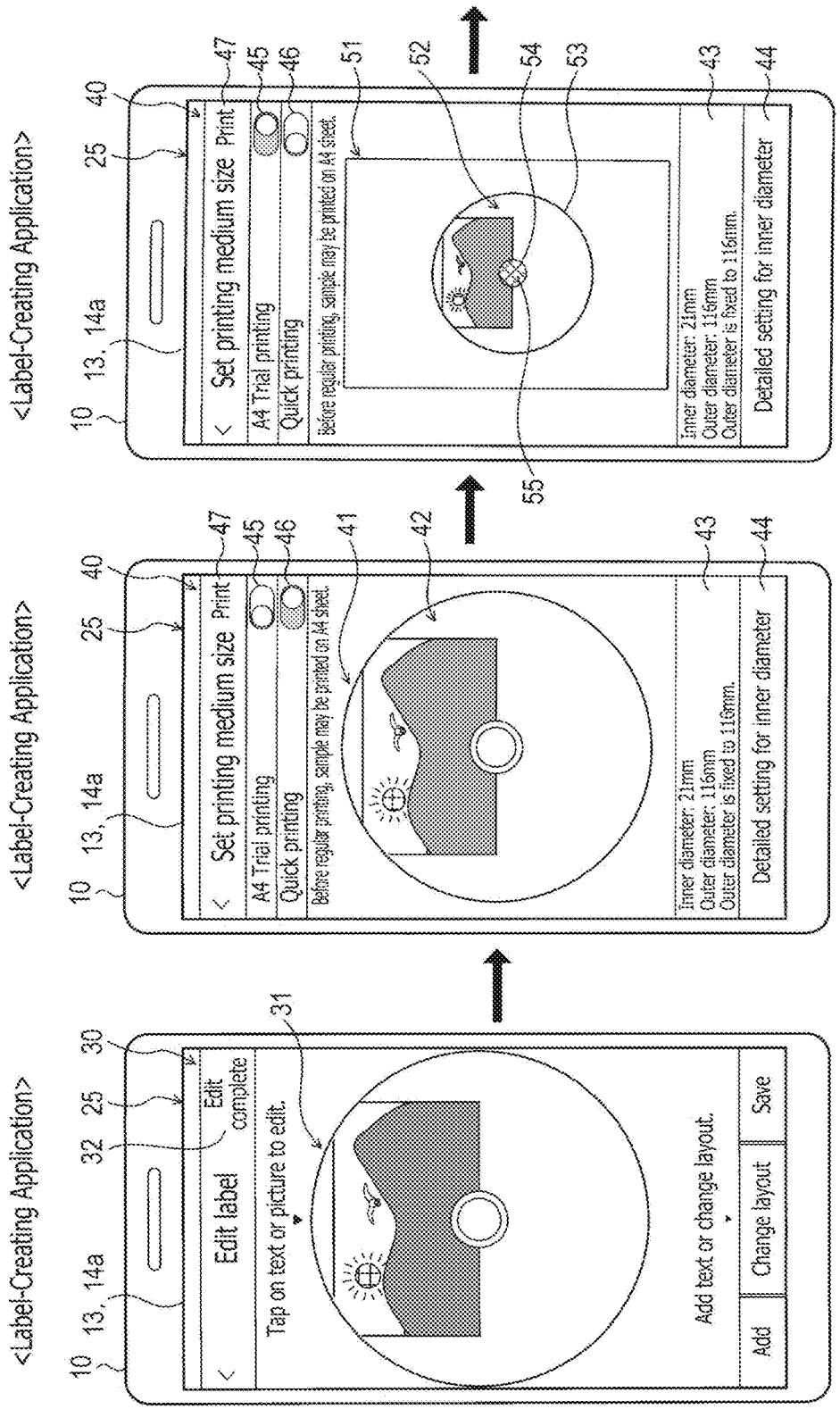
FIG. 2 illustrates printing modes which are changeable in a label-creating application in the label printing system according to the embodiment of the present disclosure.

The user may select the printing mode through the printing-mode setting switch 45 in the touch panel 14a. The printing mode in the information processing apparatus 10 may be set to the regular printing mode by default. In FIG. 2, appearance of the information processing apparatus 10 with the printing mode being set to the regular printing mode is shown at the center. Meanwhile, appearance of the information processing apparatus 10 with the printing mode being set to the trial printing mode is shown on a right-hand side in FIG. 2.

The quick-printing setting switch 46 may be a software toggle switch, through which the user may validate or invalidate a quick printing function. The user may validate or invalidate the quick printing function through the quick-printing setting switch 46 in the touch panel 46. When the quick printing function is valid, the printing apparatus 5 may perform quick printing, which will be described below. When the quick printing function is invalid, the printing apparatus 5 may perform normal printing, which will be described later in detail. The quick printing function may be invalidated by default.

The quick printing function may provide options in the printing application 12c whether a print-preview image will be displayed or skipped. In particular, when the quick printing function is valid, the printing application 12c may transmit the print data to the printing apparatus 5 without displaying the print-preview image. On the other hand, when the quick printing function is invalid, the printing application 12c may display a print-preview image and may transmit the print data to the printing apparatus 5 in response to a user's operation to the print button 63.

The printing-medium size information 43 indicates a size of the disk 8 being the printing medium. The printing-medium size information 43 may include information indicate an inner diameter, i.e., a diameter of the inner diameter region 8b, and an outer diameter of the disk 8.

An inner diameter setting button 44 is a button to be operated in order to set a size of the inner diameter of the disk 8. When the inner diameter setting button 44 is tapped by the user, a setting screen, through which the dimension of the inner diameter may be set, is displayed and the user may enter a value equivalent to the inner diameter of the disk 8 to be used through the setting screen.

In the print setting screen 40, further, displayed may be a preview image, which represents the image as a printed result from the image data created in the label-creating application 12c. In particular, one of two types of preview images, which are regular-printing preview image 41 (at the center in FIG. 2) and a trial-printing preview image 51 (on the right-hand side in FIG. 2), may be displayed according to the currently selected printing mode.

The printing mode, at the time immediately after the screen in the displayable area 25 of the display 13 is switched from the label editor screen 30 to the print setting screen 40, may be the regular printing mode by default. Therefore, in the print setting screen 40, which is displayed immediately after having been switched from the label editor screen 30, for example, may be the regular-printing preview image 41, as shown at the center in FIG. 2.

The regular-printing preview image 41 is a preview image representing an expected result of a created image 42, which is expressed by the generated image data, to be printed on the label surface 8a of the disk 8. When the printing mode is switched to the trial printing mode, for example, through the printing-mode setting switch 45, the preview image to be displayed in the print setting screen 40 is switched to the trial-printing preview image 51 (see the right-hand side in FIG. 2). The trial-printing preview image 51 is a preview image representing an expected result of a created image 52, expressed in the generated image data, printed as a sample on the printing medium other than the disk 8, e.g., A4-sized printing paper.

In the trial-printing preview image 51, an outer diameter outline 53, an inner diameter outline 54, and an inner diameter region image 55 are displayed additionally to the created image 52. The outer diameter outline 53 virtually represents either an outer rim of the disk 8 or an outer rim of an area on the label surface 8*a*, in which the created image 52 is printable. The inner diameter outline 54 virtually represents an outer rim of the inner diameter region 8*b*. The inner diameter region image 55 virtually represents the entire inner diameter region 8*b*.

The outer diameter outline 53, the inner diameter outline 54, and the inner diameter region image 55 are not printed in a regular printing operation, in which the created image 52 is printed on the disk 8. Rather, the outer diameter outline 53, the inner diameter outline 54, and the inner diameter region image 55 are added to the created image 52 in the image printed in a trial printing operation. In the trial printing operation, the created image 52 may be printed on the printing medium other than the disk 8, with the outer diameter outline 53, the inner diameter outline 54, and the inner diameter region image 55 so that the user may approximately foresee a final appearance of the created image 52 printed on the disk 8 from the result of the trial printing.

When the print button 47 is tapped by the user through the print setting screen 40, the label-creating application 12*b* transmits print-image information to the printing application 12*c* and shifts to the background. The print-image information includes image data expressing the image created in the label-creating application 12*b* in the current printing mode. Further to the image data, the print-image information includes, for example, information indicating a type and a size of the printing medium, and a print command, which will be described later in detail.

Figure 3:
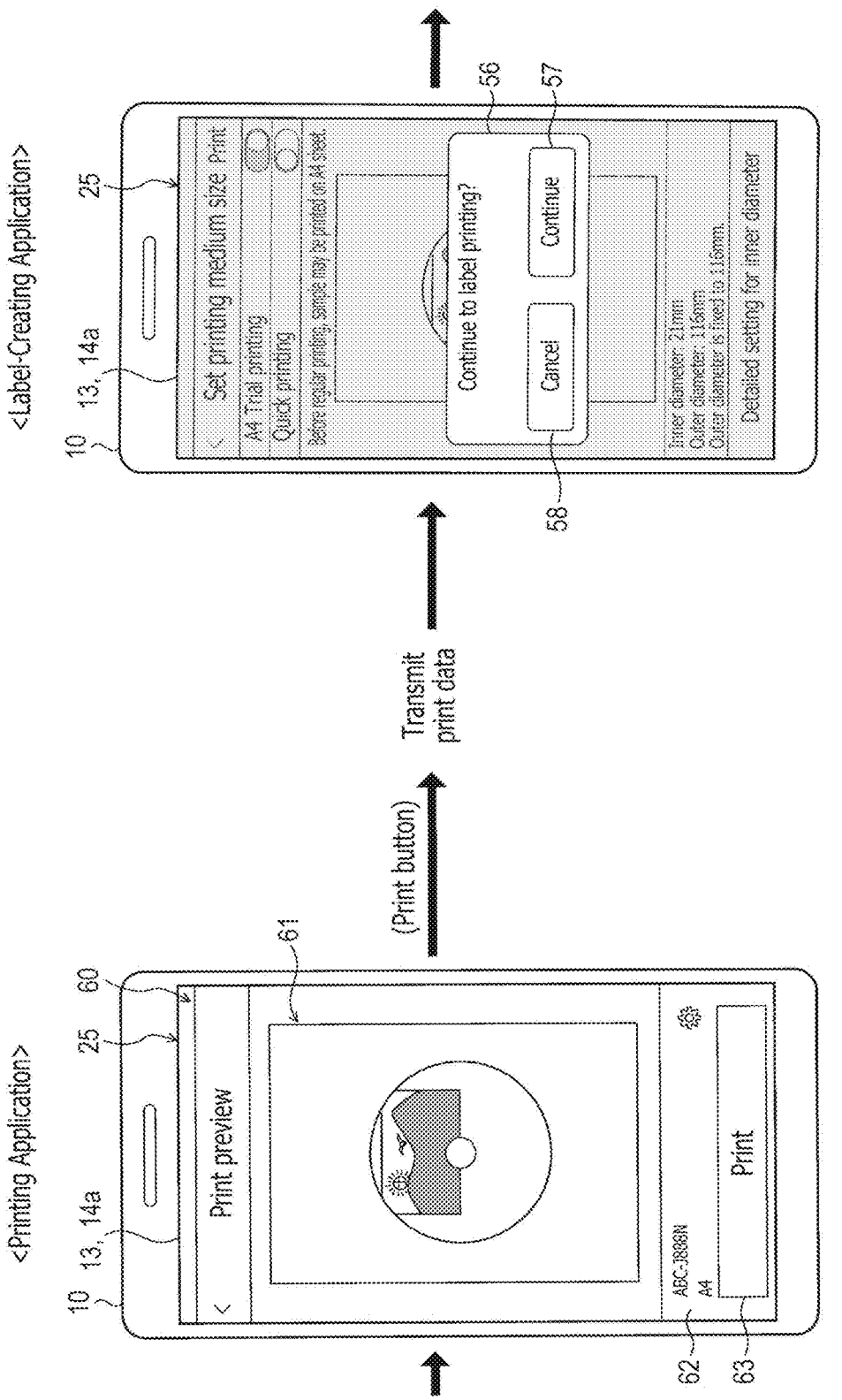
FIG. 3 illustrates a printing application and the label-creating application switched between a foreground and background in an information processing apparatus in the label printing system according to the embodiment of the present disclosure.

The printing application 12*c* receiving the print-image information from the label-creating application 12*b* shifts to the foreground and display a print preview screen 60 as shown on the left-hand side in FIG. 3. In the print preview screen 60, displayed is the preview image, which may be in the appearance similar to the print setting screen 40 (see the center and the left-hand side in FIG. 2), according to the current printing mode.

In FIG. 3, on the left-hand side, illustrated is the print preview screen, which may be displayed when the print button 47 in the print setting screen 40 as shown on the right-hand side in FIG. 2 is tapped by the user. i.e., while the information processing apparatus 10 is in the trial printing mode. In the trial printing mode, a trial-printing preview image 61 is displayed as the preview image. Meanwhile, when the information processing apparatus 10 is in the regular printing mode, a regular-printing preview image 66 (see the left-hand side in FIG. 4A) is displayed in the print preview screen 60 as the preview image.

In the print preview screen 60, further, displayed are a printing apparatus information 62 and a print button 63. The printing apparatus information 62 includes information identifying the printing apparatus 5 and information concerning the printing medium according to the current printing mode.

When the print button 63 is tapped by the user, the printing application 12*c* may generate print data based on the print-image information transmitted from the label-creating application 12*b* and transmit the print data to the printing apparatus 5. Thus, the image expressed by the image data, which was generated by the label-creating application 12*b*, may be printed in the printing apparatus 5 on the designated printing medium. Namely, either one of the regular printing operation or the trial printing operation may be conducted.

After transmitting the print data to the printing apparatus 5, the printing application 12*c* may shift to the background and work in conjunction with the OS to shift the label-creating application 12*b* to the foreground.

The label-creating application 12*b* in the trial printing mode may be shifted to the foreground after a trial printing operation and display a regular printing inquiry screen 56 (see the right-hand side in FIG. 3) in the displayable area 25 of the display 13. When the cancel button 58 in the regular printing inquiry screen 56 is tapped by the user, the label-creating application 12*b* may not shift to the regular printing mode but may display the print setting screen 40 in the displayable area 25 of the display 13. On the other hand, when a regular printing continuation button 57 in the regular printing inquiry screen 56 is tapped by the user, the label-creating application 12*b* may switch the printing mode to the regular printing mode, generate the print-image information for a regular printing operation, and transmit the generated print-image information to the printing application 12*c*.

The printing application 12*c* receiving the print-image information may display the print preview screen 60 containing a regular-printing preview image 66, as shown on the left-hand side in FIG. 4A. In the print preview screen 60, the information concerning the printing medium. e.g., the label to have the image printed thereon, may be displayed as the printing apparatus information 62.

When the print button 63 in the print preview screen 60, showing the regular-printing preview image 66, is tapped by the user, the printing application 12*c* may display a printer condition confirmation guidance 71, as shown on the right-hand side in FIG. 4A.

The printer condition confirmation guidance 71 includes a message, which may prompt the user to confirm a condition of the printing apparatus 5, and an OK button 72. The message in the printer condition confirmation guidance 71 may, for example, prompt the user to see whether the printing medium, e.g., the disk 8, for the regular printing operation is secured in the printing apparatus 5. When the OK button 72 is tapped, the printing application 12*c* may generate print data for the regular printing operation and transmit the generated print data to the printing apparatus 5. The printing apparatus 5 receiving the print data may conduct the regular printing operation with the disk 8.

Meanwhile, the label-creating application 12*b*, which transmitted the print-image information for the regular printing operation to the printing application 12*c* and shifted to the background, may be called once again to the foreground and display the printer condition confirmation guidance 71, as shown in FIG. 4B, which may be in the same appearance as the printer condition confirmation guidance 71 (see the right-hand side in FIG. 4A) displayed by the printing application 12*c*.

5. Label Image Creating Process

In the following paragraphs, described with reference to FIGS. 5-6 will be a label image creating process to be conducted by the controller 11 running the label-creating application 12*b*. In FIGS. 5-6, in order to simplify the explanation, a part of the label image creating process that may be performed after the label editor screen 30 (see the left-hand side in FIG. 2) is displayed will be described, and another part of the label image creating process that may be performed before the label editor screen 30 is displayed will be omitted.

After activation of the information processing apparatus 10, in response to an event to activate the label-creating application 12*b*, the controller 11 may activate the label-creating application 12*b*. Before the controller 11 displays the label editor screen 30, the controller 11 may accept the user's selection for the layout, selection of the picture, and adjustment for the position and the size of the picture, as mentioned earlier. When the edit completion button 32 is tapped by the user through the label editor screen 30, in S110, the controller 11 enters the image to be printed.

In S120, the controller 11 obtains initial values for setting of the printing mode. As mentioned earlier, the initial printing mode by default is the regular printing mode. In S130, the controller 11 displays the print setting screen 40 (see the center in FIG. 2). In S140, the controller 11 determines whether the user commanded to print the image. In other words, the controller 11 determines whether the print button 47 in the print setting screen 40 was tapped. If the print button 47 was tapped, the flow proceeds to S150.

In S150, the controller 11 determines the current printing mode. As shown in FIG. 5, the information processing apparatus 10 may operate in one of three printing modes: the regular printing mode, the trial printing mode, and a trial-and-regular printing mode, which has not been mentioned yet. The trial-and-regular printing mode is a printing mode, in which trial printing and regular printing may be serially conducted.

If the current printing mode is the trial printing mode, the flow proceeds to S200. In S200, the controller 11 generates image data for trial printing. In S210, the controller 11 processes the image data generated in S200 into an image containing the outer diameter outline 53 and the inner diameter outline 54. In S220, the controller 11 sets A4 as the printing medium size and regular paper as the printing medium type. In S230, the controller 11 obtains a print command, which indicates validity or invalidity of the quick printing function. When the quick printing function is valid, the controller 11 may obtain a quick print command, and when the quick printing function is invalid, the controller 11 may obtain a normal print command. In S240, the controller 11 sets a trial printing in-progress flag on. In FIGS. 5-6, a sign "T" indicates a condition of a flag, including the trial printing in-progress flag, being on. Meanwhile, a sign "F" indicates a condition of the flag being off. The flow proceeds to S260.

In S260, the controller 11 activates the printing application 12c in conjunction with the OS 12a and transmit print-image information for trial printing, including the generated image data and the setting information, to the printing application 12c. In this regard, the action of transmitting data from the label-creating application 12b to the printing application 12c may mean providing the data from the label-creating application 12b to the printing application 12c. After transmitting the print-image information to the printing application 12c, in S270, the controller 11 works in conjunction with the OS 12a to shift the label-creating application 12b from the foreground to the background so that the flow returning to S130 and processes onward in the label-creating application 12h may be conducted in the background.

In S150, when the current printing mode is the regular printing mode, the flow proceeds to S160. In S160, the controller 11 generates image data for regular printing. In S170, the controller 11 sets a size of the label, i.e., the size of the label surface 8a, as the printing medium size and a disk as the printing medium type. In S180, similarly to S230, the controller 11 obtains the print command. In S190, the controller 11 sets a regular printing in-progress flag on. The flow proceeds to S260. In S260, if the flow reaches S260 through S190, the controller 11 transmits print-image information for regular printing, including the generated image data and the setting information, to the printing application 12c.

In S150, when the current printing mode is the trial-and-regular printing mode, the flow proceeds to S250. In the trial-and-regular printing mode, both the print-image information for trial printing and the print-image information for regular printing are generated in the same manners as S200-S240 and S160-S190, respectively. Further, in S250, the controller 11 generates a trial-and-regular print command, which indicates the trial-and-regular printing mode. In S260, if the flow reaches S260 through S250 the controller 11 transmits print-image information for both trial printing and for regular printing together with the print command to the printing application 12c.

Meanwhile, in S140, when no print command is given by the user, the flow proceeds to S310 (see FIG. 6). In S310, the controller 11 determines whether the printing modes were changed through the printing-mode setting switch 45. When the printing modes were changed, the flow proceeds to S320. In S320, the controller 11 saves the new printing mode. In S330, the controller 11 displays a preview image according to the new printing mode in the print setting screen 40. The flow returns to S130.

In S310, when the printing mode was not changed, the flow proceeds to S340. In S340, the controller 11 determines whether the OS 12a conducted an action to shift the label-creating application 12b from the background to the foreground. In particular, the controller 11 determines whether it is shortly after the label-creating application 12b was shifted from the background to the foreground. More specifically, the controller 11 determines whether this is, for example, a first time for the label-creating application 12b to reach S340 since the label-creating application 12b was shifted from the background to the foreground.

If no action to shift the label-creating application 12b from the background to the foreground has been conducted, that is, if the label-creating application 12b is still running in the background, or if the label-creating application 12b has been running already in the foreground, the flow returns to S130. If the action to shift the label-creating application 12b from the background to the foreground was conducted, the flow proceeds to S350.

In S350, the controller 11 determines whether the trial printing in-progress flag is on. If the trial printing in-progress flag is on, the flow proceeds to S360. In 8360, the controller 11 clears the trial printing in-progress flag off. In S370, the controller 11 determines whether the trial printing operation is completed. In particular, the controller 11 determines whether a trial printing completion flag is cleared off by the printing application 12c. The trial printing completion flag may be set under administration of the OS 12a in a predetermined storage area in the memory 12 and is accessible to both the label-creating application 12b and the printing application 12c.

If the trial printing completion flag is off, the flow returns to S130. If the trial printing completion flag is on, the flow proceeds to S380. In S380, the controller 11 clears the trial printing completion flag off.

In S390, the controller 11 displays the regular printing inquiry screen 56 (see the right-hand side in FIG. 3). In S400, the controller 11 receives an operation by the user to the regular print inquiry screen 56. If the user taps on the regular printing continuation button 57, the flow proceeds to S410. In S410, the controller 11 switches the printing mode to the regular printing mode, and the flow proceeds to S160. In S160 and onward, the processes for regular printing may be conducted.

In S400, if the user taps on the cancel button 58, the flow proceeds to S420. In S420, the controller 11 deletes the regular printing inquiry screen 56. The flow returns to S130.

On the other hand, in 8350, if the trial printing in-progress flag is cleared, the flow proceeds to S430. In S430, the controller 1 determines whether the regular printing in-progress flag is on. If the regular printing in-progress flag is off, the flow returns to S130. If the regular printing in-progress flag is on, the flow proceeds to S440.

In S440, the controller 11 clears the regular printing in-progress flag. In s450, the controller 11 displays the printer condition confirmation guidance 71 (see FIG. 4A) in the displayable area 25 in the display 13. Following S450, the flow returns to S130.

6. Print Data Transmitting Process

In the following paragraphs, with reference to FIGS. 7-8, described will be a print data transmitting process to be conducted by the controller 11 running the printing application 12c. The controller 11, after being activated, may start the printing application 12c in response to an activating event in the label-creating application 12b.

In the printing application 12c, in S610, the controller 11 determines whether the image data for printing is received. In this regard, the action of receiving data may mean accepting data provided from another software application. If the image data for printing is received, the flow proceeds to S620. If the printing application 12c is running in the background when the image data is received, the printing application 12c is shifted by the OS 12a to the foreground.

In S620, the controller 11 obtains the received image data and displays the print preview screen 60 in the displayable area 25 of the display 13. In 8630, the controller 11 determines whether a transmitting source of the received image data is the label-creating application 12b. In other words, the controller 11 determines whether the print-image information containing the image data is transmitted from the label-creating application 12b.

If the transmitting source is not the label-creating application 12b, the flow proceeds to S680. In S680, the controller 11 displays a preview image of the received image data at the current setting. The flow proceeds to S740 (see FIG. 8).

Meanwhile, in S630, if the label-creating application 12b is the transmitting source of the received image data, the flow proceeds to S640. In S640, the controller 11 determines content of the print command contained in the received print-image information. If the print command is a normal print command, the flow proceeds to S710 (see FIG. 8).

In S710, the controller 11 determines whether the printing medium size indicated in the setting information in the received print-image information is "A4" or "label." If the print printing medium size is "A4," the flow proceeds to S720.

In S720, the controller 11 displays a preview image for the received image data in the A4 size in the print preview screen 60. In other words, the trial-printing preview image 61 is displayed. In S730, the controller 11 displays the printing apparatus information 62 indicating "A4" as the printing medium size in the print preview screen 60. In S740, the controller 11 waits for the print button 63 to be tapped by the user. When the print button 63 is tapped, the flow proceeds to S750.

In S750, the controller 11 generates print data for trial printing based on the received print-image information and transmit the generated print data to the printing apparatus 5. The printing apparatus 5 receiving the print data may conduct a trial printing operation.

In S760, the controller 11 determines whether the transmitting source of the received image is the label-creating application 12b. If the label-creating application 12b is not the transmitting source, the flow proceeds to S610. If the label-creating application 12b is the source of the received image data, the flow proceeds to S770.

In S770, the controller 11 sets the trial printing completion flag on. In S780, the controller 11 works in conjunction with the OS 12a to shift the label-creating application 12b to the foreground. In S790, the controller 11 works in conjunction with the OS 12a to shift the printing application 12c to the background. The flow returns to S610, and processes onward in the printing application 12c may be continued in the background.

In S710, if the printing medium size is "label," the flow proceeds to S800. In S800, the controller 11 displays a preview image for the received image data in the size of the label in the print preview screen 60. In other words, a print-preview image for regular printing is displayed. In S810, the controller 11 displays the printing apparatus information 62 indicating "label" as the printing medium size in the print preview screen 60. In S820, the controller 11 waits for the print button 63 to be tapped by the user. When the print button 63 is tapped, the flow proceeds to S830.

In S830, the controller 11 generates print data for regular printing based on the received print-image information and transmit the generated print data to the printing apparatus 5. The printing apparatus 5 receiving the print data may conduct a regular printing operation. In S840, the controller 11 displays the printer condition confirmation guidance 71. The flow returns to S610.

In S640, if the print command is a quick print command, the flow proceeds to S650. In S650, the controller 11 determines whether the printing medium size indicated in the setting information in the received print-image information is "A4" or "label." If the printing medium size is "A4," the flow proceeds to S750 (see FIG. 8). In S750 and onward, the processes for regular printing may be conducted.

In S640, if the print command is a trial-and-regular print command, the flow proceeds to S660. In S660, the processes for trial printing are conducted. In particular, the processes same as S720-S770 are conducted. Following S660, in S670, the processes for regular printing are conducted. In particular, the processes same as S800-S810 are conducted. Following S670, the flow returns to S610.

7. Benefits

According to the embodiment described above, benefits including those as described below may be achievable.

The user may set the printing mode selectively between the trial printing mode and the regular printing mode in the label-creating application 12b and transmit the print-image information according to the selected printing mode to the printing application 12c. Therefore, the printing application 12c may transmit the print data according to the printing mode to the printing apparatus 5, which may print the image on the printing medium according to the printing mode. Thus, the label-creating application 12b and the printing application 12c may work in conjunction with each other so that the user may achieve the image created in the label-creating application 12b efficiently printed in trial printing and/or regular printing.

The label-creating application 12b may display the preview image in the print setting screen 40 according to the currently operating printing mode. Therefore, the user may recognize the currently operating printing mode easily and may foresee the expected image as a printed result on the printing medium according to the currently operating printing mode.

In the trial printing mode, the outer diameter outline 53, the inner diameter outline 54, and the inner diameter region image 55 are added to the image created by the user. Therefore, the user may approximately foresee a final image, which may be printed in the regular printing operation on the disk 8, from the result of the trial printing.

The label-creating application 12*b* may transmit the print-image information for trial printing to the printing application 12*c* and shift from the foreground to the background. Thereafter, if the label-creating application 12*b* once again shifts to the foreground in order to conduct processes for trial printing, the label-creating application 12*b* may display the regular printing inquiry screen 56. When the user enters a command for regular printing, the label-creating application 12*b* may conduct processes for regular printing. Thus, the printing modes may be switched from the trial printing mode to the regular printing mode efficiently.

The user may operate the printing-mode setting switch 45 to switch the printing modes back and force easily. Further, the user may validate or invalidate the quick printing setting so that the image created in the label-creating application 12*b* may be printed in one of the quick printing operation and the normal printing operation.

More Examples

Although an example of carrying out the invention have been described, those skilled in the art will appreciate that there are numerous variations and permutations of the information processing apparatus and the computer readable storage medium for the information processing apparatus that fall within the spirit and scope of the disclosure as set forth in the appended claims.

For example, the printing modes may not necessarily be switched by the operation through the printing-mode setting switch 45 but may be switched in a different manner. Further, validity or invalidity of the quick printing function may not necessarily be switched by the operation to the quick-printing setting switch 46 but may be switched in a different manner.

For another example, the size and the type of the printing medium for trial printing may not necessarily be limited to the A4-size and paper. For example, the user may be allowed to select at least one of the size and the type of the printing medium for trial printing.

For another example, in FIG. 6, following S380, the flow may directly proceed to S410 without displaying the regular printing inquiry screen 56. Namely, after the trial printing operation, the regular printing operation may be automatically conducted continuously from the trial printing operation without asking the user's preference.

For another example, the printing medium may not necessarily be limited to the disk 8. For another example, the information processing apparatus 10 may not necessarily be limited to the mobile terminal.

For another example, multiple functions implemented by a single item in the embodiment described above may rather be assigned to multiple items, or a single function assigned to a single item in the embodiment described above may rather be implemented by multiple items. For another example, multiple functions assigned to multiple items in the embodiment described above may rather be implemented by a single item, or a single function implemented by multiple items in the embodiment described above may rather be implemented by a single item. For another example, one or more items in the configuration described above may be omitted. It is to be understood that the subject matter defined in the appended claims is not necessarily limited to the specific features or act described above. Rather, the specific features and acts described above are disclosed as example forms of implementing the claims.

What is claimed is:

1. A non-transitory computer readable storage medium storing computer readable instructions that are executable by a computer in an information processing apparatus comprising a display and an input interface, the computer being configured to run a printing program and an image processing program, the computer running the printing program being configured to generate print data to be used in a printing apparatus to print an image indicated by image data included in print-image information received from the image processing program and transmit the generated print data to the printing apparatus, the computer readable instructions, when executed by the computer running the image processing program, causing the computer to:

generate the image to be printed on a particular type of printing medium in the printing apparatus;

control the display to display the generated image;

set a printing mode in the image processing program to one of a regular printing mode and a trial printing mode based on a setting operation input through the input interface;

generate the print-image information including the image data, the image data indicating the generated image, the computer generating, in a case where the printing mode is set to the regular printing mode, the print-image information to be used in the printing apparatus to print the image on the particular type of printing medium, and the computer generating, in a case where the printing mode is set to the trial printing mode, the print-image information to be used in the printing apparatus to print the image on another type of printing medium different from the particular type;

transmit the generated print-image information to the printing program;

in the case where the printing mode is set to the trial printing mode and after transmitting the print-image information from the image processing program to the printing program, control the display to display an inquiry screen to inquire whether the printing mode is to be shifted from the trial printing mode to the regular printing mode;

receive a response to the inquiry through the input interface;

in a case where a response indicating a request to shift the printing mode from the trial printing mode to the regular printing mode is received through the input interface, shift the printing mode from the trial printing mode to the regular printing mode; and in response to shifting the printing mode from the trial printing mode to the regular printing mode, generate the print-image information and transmit the generated print-image information to the printing program.

2. The computer readable storage medium according to claim 1, wherein, the computer readable instructions cause the computer running the image processing program to, in the case where the printing mode is set to the regular printing mode, control the display to display a first printed image indicating the image being printed on the particular type of printing medium, and in the case where the printing mode is set to the trial printing mode, control the display to display a second printed image indicating the image being printed on the another type of printing medium.

3. The computer readable storage medium according to claim 1,
wherein the computer readable instructions cause the computer running the image processing program to, in the case where the printing mode is set to the trial printing mode, generate the image data indicating an image including the generated image and an outline image additionally, the outline image representing one of an outline of the particular type of printing medium and an outline of a printable area in the particular type of printing medium.

4. The computer readable storage medium according to claim 1,
wherein the computer readable instructions further cause the computer running the image processing program to:
in the case where the printing mode is set to the trial printing mode, after transmitting the print-image information from the image processing program to the printing program, and after transmission of the print data generated based on the print-image information to the printing apparatus according to the printing program, shift the printing mode from the trial printing mode to the regular printing mode; and
in response to shifting the printing mode from the trial printing mode to the regular printing mode, generate the print-image information and transmit the generated print-image information to the printing program.

5. The computer readable storage medium according to claim 1,
wherein the computer readable instructions further cause the computer running the image processing program to:
receive an instruction setting a procedure to execute a series of processes from receipt of the print-image information and transmission of the print data to the printing apparatus in the printing program between a first procedure, which requires at least one inputting operation through the input interface, and a second procedure, which requires one of none and at least a smaller number of inputting operations than the first procedure, through the input interface; and
generate the print-image information including procedure information indicating one of the first procedure and the second procedure set in the received instruction, and
wherein the computer running the printing program is configured to generate the print data and transmit the generated print data to the printing apparatus according to the one of the first procedure and the second procedure indicated in the procedure information included in the received print-image information.

6. The computer readable storage medium according to claim 1,
wherein the printing mode for the image processing program further includes a trial-and-regular printing mode, and
wherein the computer readable instructions further cause the computer running the image processing program to, in a case where the printing mode is set to the trial-and-regular printing mode, generate the print-image information to be used in the printing apparatus to print the image on the particular type of printing medium and the print-image information to be used in the printing apparatus to print the image on the another type of printing medium and transmit the generated print data to the printing program.

7. The computer readable storage medium according to claim 1,
wherein the computer readable instructions further cause the computer running the image processing program to, in the case where the printing mode is set to the regular printing mode and after transmission of the print data generated according to the regular printing mode to the printing apparatus according to the printing program, control the display to display a message concerning a condition of the printing apparatus, the condition being required to be satisfied in order for the printing apparatus to print the image indicated by the transmitted print data.

8. The computer readable storage medium according to claim 1,
wherein the particular type of printing medium includes a round disk-shaped memory medium, in which data is storable, the memory medium being configured to be printable in a circular area on a surface thereof.

9. The computer readable storage medium according to claim 8,
wherein the computer readable instructions cause the computer running the image processing program to, in the case where the printing mode is set to the trial printing mode, generate the print-image information to be used in the printing apparatus to print the image on a rectangular-shaped paper medium.

10. The computer readable storage medium according to claim 8,
wherein the circular area on the surface of the memory medium includes a concentric non-printable region, in which no image is printable, at a central position in the circular area, and
wherein the computer readable instructions cause the computer running the image processing program to, in the case where the printing mode is set to the trial printing mode, generate the image data indicating the generated image with a particular image arranged at a position corresponding to the non-printable region, the particular image indicating incapability of printing in the non-printable region on the surface of the memory medium.

11. An information processing apparatus, comprising:
a display;
an input interface; and
a controller configured to run a printing program and an image processing program, the controller being configured to:
generate an image to be printed on a particular type of printing medium in a printing apparatus according to the image processing program;
control the display to display the generated image according to the image processing program;
set a printing mode in the image processing program to one of a regular printing mode and a trial printing mode based on a setting operation input through the input interface according to the image processing program;
generate print-image information including image data according to the image processing program, the image data indicating the generated image, the controller generating, in a case where the printing mode is set to the regular printing mode, the print-image information to be used in the printing apparatus to print the image on the particular type of printing medium, and in a case where the printing mode is set to the trial printing mode, the controller generating the print-image information to be used in the printing apparatus to print the image on another type of printing medium different from the particular type;

transmit the generated print-image information to the printing program according to the image processing program;

in the case where the printing mode is set to the trial printing mode and after transmitting the print-image information from the image processing program to the printing program, control the display to display an inquiry screen to inquire whether the printing mode is to be shifted from the trial printing mode to the regular printing mode;

receive a response to the inquiry through the input interface;

in a case where a response indicating a request to shift the printing mode from the trial printing mode to the regular printing mode is received through the input interface, shift the printing mode from the trial printing mode to the regular printing mode;

in response to shifting the printing mode from the trial printing mode to the regular printing mode, generate the print-image information and transmit the generated print-image information to the printing program; and generate print data according to the printing program, the print data being used in the printing apparatus to print the image indicated by the image data included in the print-image information received from the image processing program.

12. A method for processing an image in an information processing apparatus, the information processing apparatus comprising a display and being configured to run an image processing program and a printing program, the method comprising:

generating the image to be printed on a particular type of printing medium in a printing apparatus according to the image processing program;

controlling the display to display the generated image according to the image processing program;

setting a printing mode in the image processing program to one of a regular printing mode and a trial printing mode based on input of a setting operation according to the image processing program;

in a case where the printing mode is set to the regular printing mode, generating print-image information to be used in the printing apparatus to print the image on the particular type of printing medium, and in a case where the printing mode is set to the trial printing mode, generating the print-image information to be used in the printing apparatus to print the image on another type of printing medium different from the particular type;

transmitting the generated print-image information to the printing program according to the printing program;

in the case where the printing mode is set to the trial printing mode and after transmitting the print-image information from the image processing program to the printing program, displaying an inquiry screen to inquire whether the printing mode is to be shifted from the trial printing mode to the regular printing mode;

receiving a response to the inquiry through user input;

in a case where a response indicating a request to shift the printing mode from the trial printing mode to the regular printing mode is received through user input, shifting the printing mode from the trial printing mode to the regular printing mode;

in response to shifting the printing mode from the trial printing mode to the regular printing mode, generating the print-image information and transmit the generated print-image information to the printing program; and generating print data according to the printing program, the print data being used in the printing apparatus to print the image included in the print-image information received from the image processing program.

13. A non-transitory computer readable storage medium storing computer readable instructions that are executable by a computer in an information processing apparatus comprising a display and an input interface, the computer being configured to run a printing program and an image processing program, the computer running the printing program being configured to generate print data to be used in a printing apparatus to print an image indicated by image data included in print-image information received from the image processing program and transmit the generated print data to the printing apparatus, the computer readable instructions, when executed by the computer running the image processing program, causing the computer to:

generate the image to be printed on a particular type of printing medium in the printing apparatus;

control the display to display the generated image;

set a printing mode in the image processing program to one of a regular printing mode and a trial printing mode based on a setting operation input through the input interface;

generate the print-image information including the image data, the image data indicating the generated image, the computer generating, in a case where the printing mode is set to the regular printing mode, the print-image information to be used in the printing apparatus to print the image on the particular type of printing medium, and the computer generating, in a case where the printing mode is set to the trial printing mode, the print-image information to be used in the printing apparatus to print the image on another type of printing medium different from the particular type; and transmit the generated print-image information to the printing program in the case where the printing mode is set to the trial printing mode, after transmitting the print-image information from the image processing program to the printing program, and after transmission of the print data generated based on the print-image information to the printing apparatus according to the printing program, shift the printing mode from the trial printing mode to the regular printing mode; and in response to shifting the printing mode from the trial printing mode to the regular printing mode, generate the print-image information and transmit the generated print-image information to the printing program.

* * * * *